P. B. HEWLETT.
MILKING MACHINE.
APPLICATION FILED JULY 19, 1920.
1,387,713.
Patented Aug. 16, 1921.
4 SHEETS—SHEET 4.
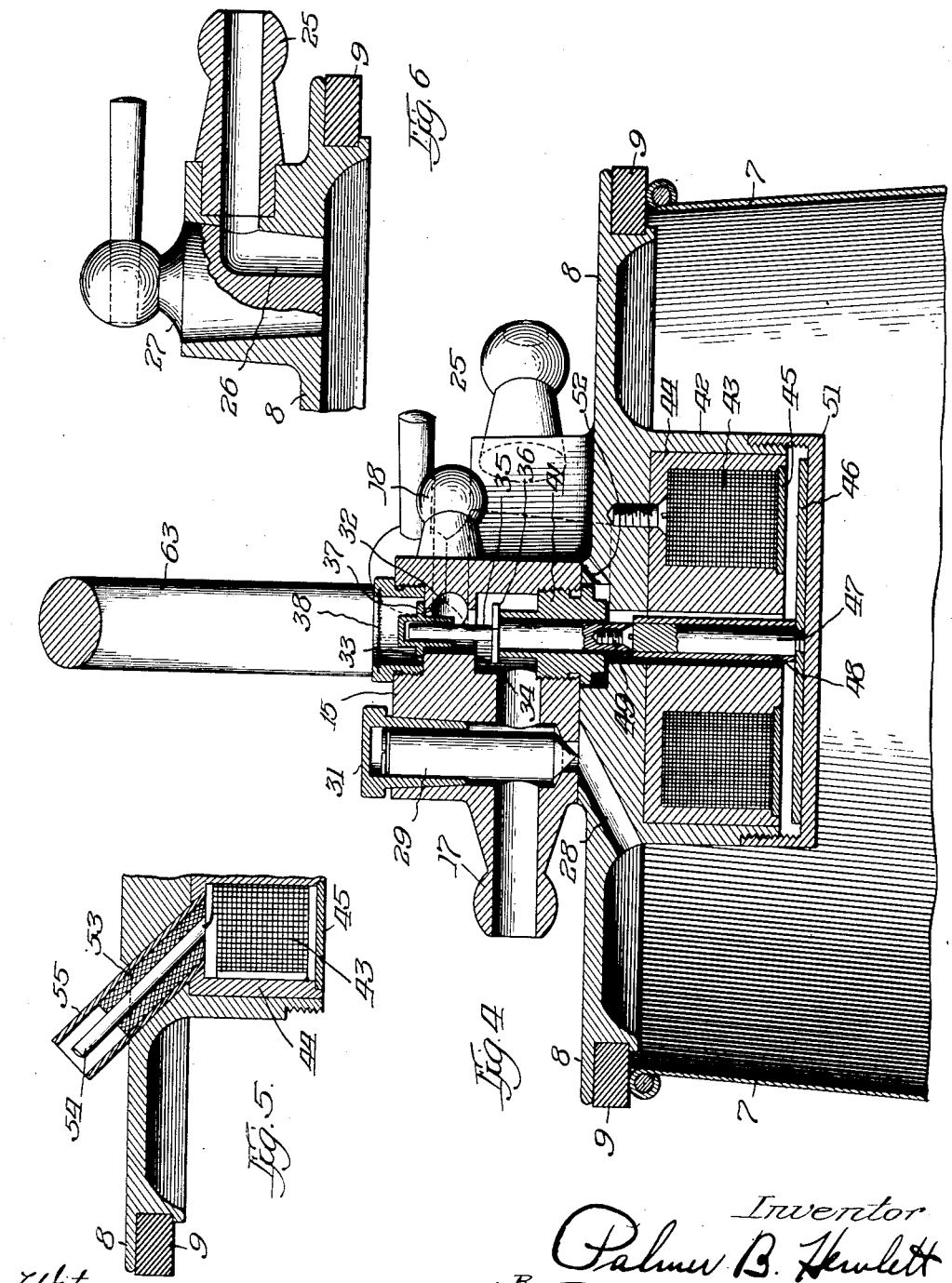

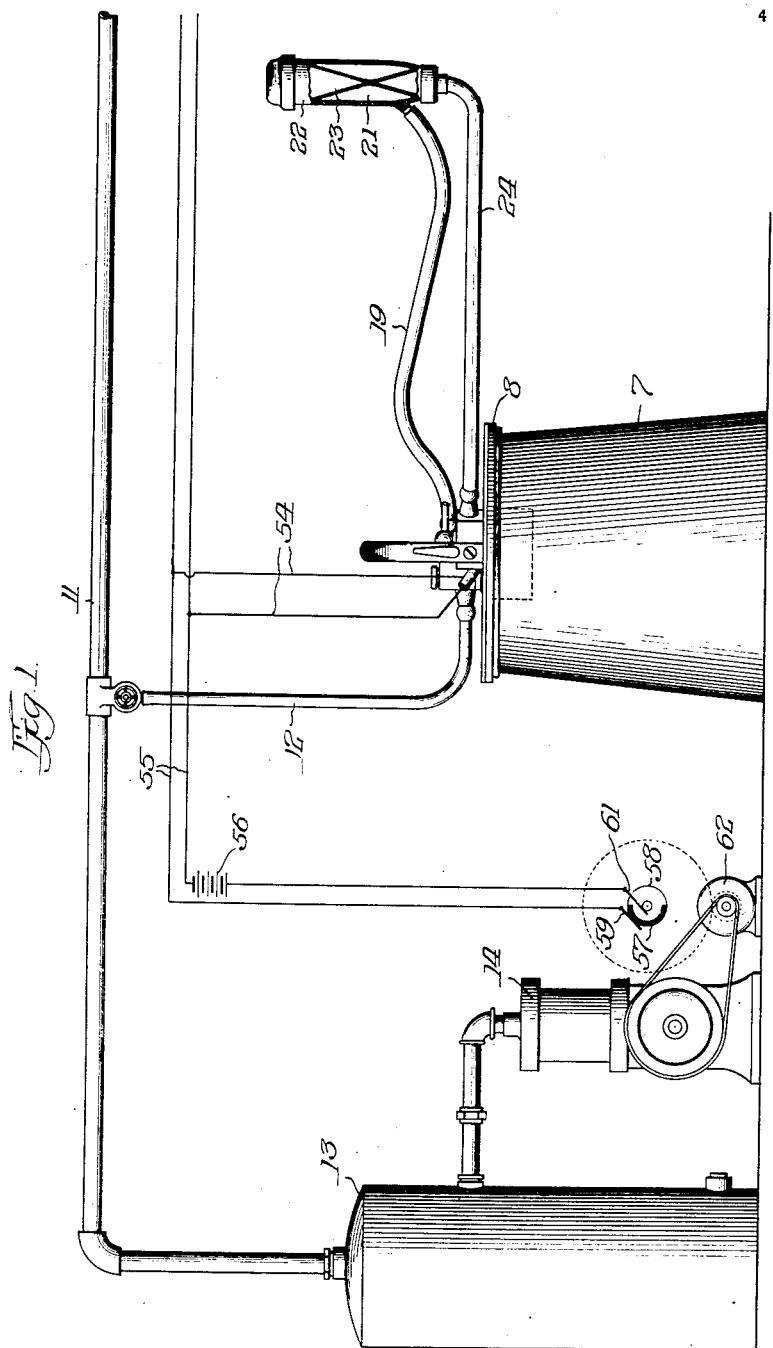

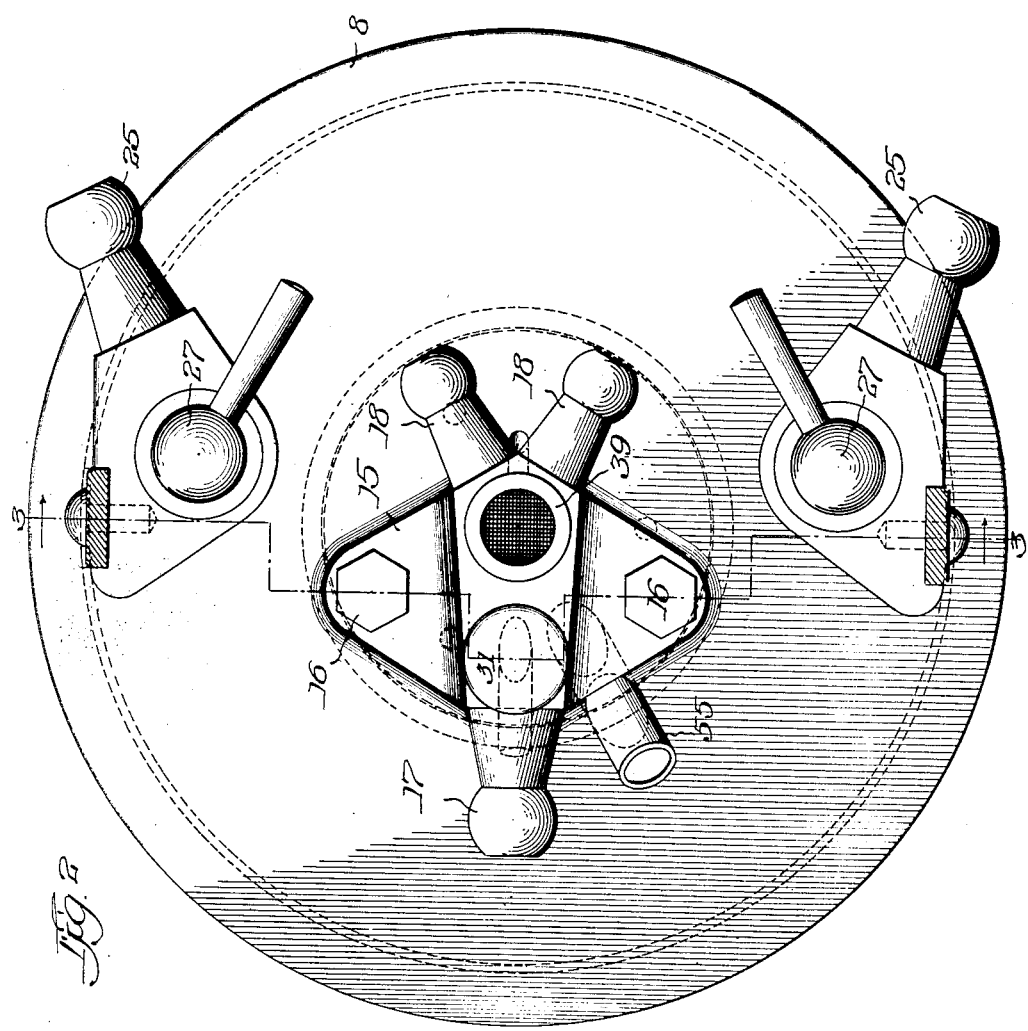

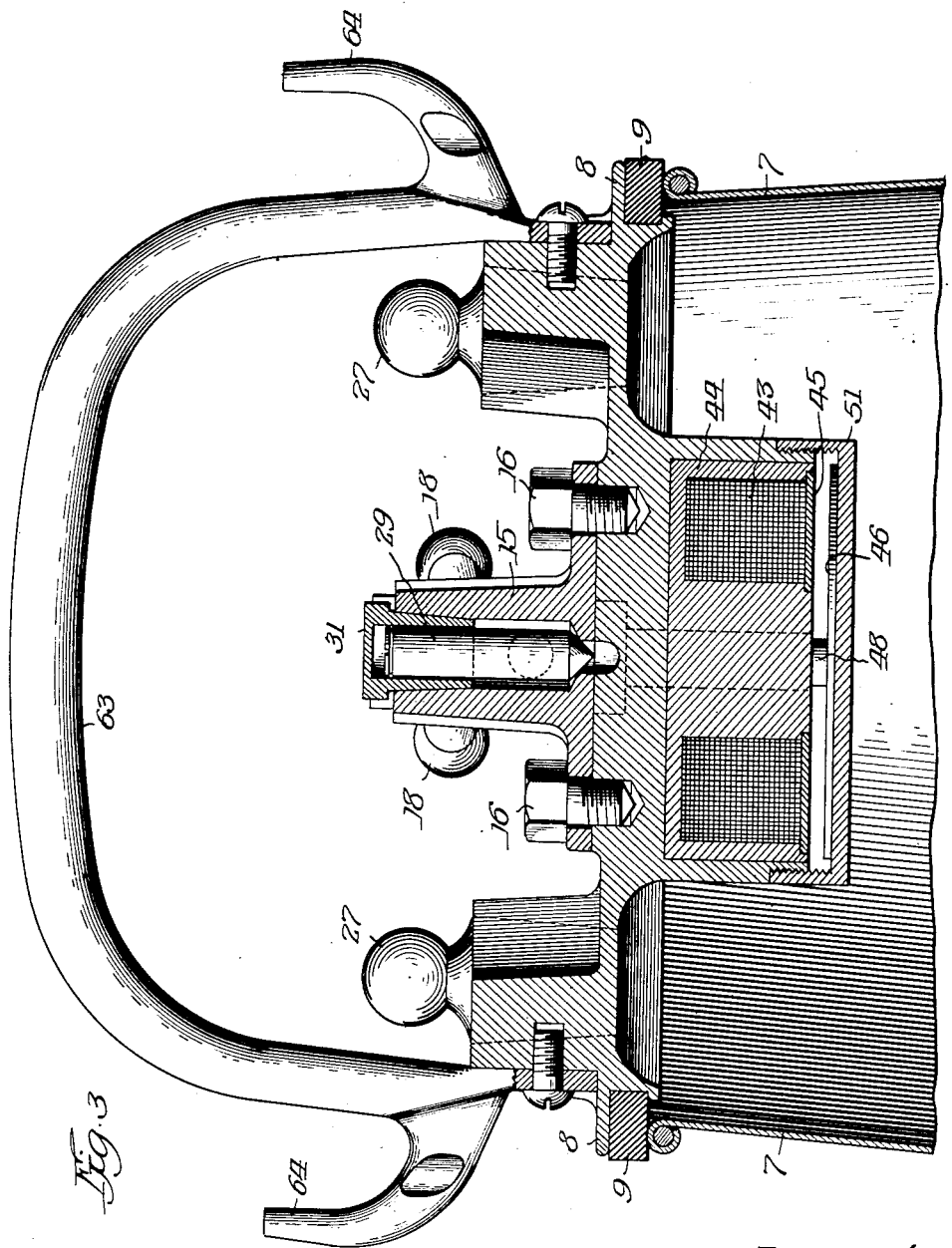

UNITED STATES PATENT OFFICE.

PALMER B. HEWLETT, OF SAN FRANCISCO, CALIFORNIA.

MILKING-MACHINE.

1,387,713.  Specification of Letters Patent.  Patented Aug. 16, 1921.

Application filed July 19, 1920. Serial No. 397,157.

*To all whom it may concern:*

Be it know that I, PALMER B. HEWLETT, a citizen of the United States, residing at San Francisco, in the county of San Francisco and State of California, have invented new and useful Improvements in Milking-Machines, of which the following is a specification.

This invention relates in general to milking machines, and has more particular reference to machines of the pulsator type in which a pulsating vacuum is created in the teat cups.

One of the primary purposes of my present invention is the provision of a milking machine in which the pulsator valve, by which the vacuum pulsations are controlled, will be positively actuated, irrespective of the degree of vacuum produced so that the pulsation will be created and continued with rhythmic regularity and will not be affected by any rise or fall in the vacuum itself. In machines in which a pneumatically actuated pulsator is employed, a variation in the vacuum will affect the speed of the pulsator, with the result that should one or more of the teat cups be shut off, the pulsator will speed up proportionately to the increase in the vacuum instead of continuing to operate with rhythmic regularity, as is the case in my present invention.

Another object of this invention is to provide a machine which will be devoid of diaphragms, pistons, springs and other complications which are liable to get out of order and render the machine inoperative, my invention being designed with a view of extreme simplicity of structure so that it will operate efficiently and reliably for long periods of time without repairs or attention by the operator.

Still another object is to provide a machine which can be easily cleaned and maintained in a sanitary condition, and one which can be submerged and thoroughly washed without danger of injury to any of the parts.

Other objects and many of the inherent advantages of my invention should be readily appreciated as the same becomes better understood by reference to the following description, when considered in connection with the accompanying drawings.

Referring to the drawings:

Figure 1 is a side elevation of a milking machine and its associated mechanism embodying my invention;

Fig. 2 is a plan view of the pail cover with the equipment mounted thereon;

Fig. 3 is a sectional view on the line 3—3 of Fig. 2;

Fig. 4 is a similar view taken at right angles to Fig. 1;

Fig. 5 is a fragmentary sectional view, showing the plug connection to the electromagnet; and Fig. 6 is a fragmentary detail of one of the shut off valves.

Referring now to the drawings more in detail, reference character 7 indicates the receptacle or pail in which the milk is collected, this pail being normally covered and sealed when in use by a cover 8, provided with a sealing ring 9 of rubber or other suitable material by which an air tight seal between the receptacle and cover is secured.

A vacuum, or partial vacuum, is constantly induced in this receptacle through a main vacuum line 11 connected to the receptacle by hose 12, this line being connected to a vacuum storage and equalizing chamber 13, in which the vacuum is induced by a vacuum pump 14 of any preferred construction.

Upon the top of the cover 8, there is mounted a pulsator valve casing indicated generally by reference character 15, which is secured to the cover by lag bolts 16, or the like. This casing is provided with a nipple 17, to which the hose 12 is connected and at its opposite side, it is provided with a pair of similar nipples 18, each adapted to be connected to the air hose 19 leading from the casing to the exterior chamber 21 of a teat cup 22 of any preferred construction, comprising a rigid outer wall and a flexible inner wall 23.

The bottom of the teat cup is connected by a hose 24 to one of the nipples 25 formed on the cover 8 and communicating with the interior of the receptacle 7 through a passage 26 in a shut off valve 27. The valves 27 are of the tapered turnplug type so that they may be readily lifted from their seats and cleaned to maintain them in sanitary condition. It will be observed that there are two nipples 18 and two of the nipples 25, thus providing connection for two independent milking lines, each consisting of an air hose 19 and a milk hose 24. While in Fig. 1 I have shown the hose 19 and 24 as connected directly to a teat cup, in practice it is customary to connect the hoses 19 and 24 to a header equipped with four branches, each attached to a teat cup so that each line takes care of four teat cups. Thus it will be apparent that the two lines from the pail are each adapted for milking the four teats of a cow so that two cows can be milked simultaneously from one receptacle.

The vacuum induced in the nipple 17 through the hose 12 is transmitted to the interior of the pail 7 through a passage 28 in the cover 8, and in order that fluctuations in the vacuum may not be transmitted to the receptacle, I have provided a check valve 29 between the nipple 17 and the passage 28 which opens upwardly under vacuum induced in the hose 12, but closes if the vacuum above the valve becomes less than that in the receptacle. For purposes of sanitation, this valve is made removable and is retained in position and protected against the entrance of dirt from the exterior by a removable cap 31.

Since the receptacle 7 is constantly under vacuum, the interior chamber of the teat cup inside the flexible wall or lining 23 will be constantly under vacuum. The pulsations in the teat cup, causing the lining 23 to expand and contract, are caused by the alternate application of vacuum and atmospheric air pressure to the chamber 21. When atmospheric air is admitted through the hose 19, the lining 23 will be collapsed into the position shown in Fig. 1 and when vacuum is applied outside this lining through the hose 19, the lining will expand into substantial parallelism with the exterior walls of the teat cup, thereby permitting direct application of suction to the teat through the hose 24.

These pulsations occasioned by the alternate application of suction and atmospheric air to the hose 19 are secured by a pulsator valve within the casing 15. Referring particularly to Fig. 4, where this valve is best shown, it will be observed that the interior of the casing is provided above and below the bores 32 of the nipples 18 with horizontally disposed valve seats 33 and 34 respectively. A valve stem 35 disposed vertically within the chamber, is provided with a valve disk 36 adapted to seat upwardly against the seat 34 and above the seat 33 there is a valve 37 adapted to seat upon the seat 33 and to be lifted therefrom by the upper end of the stem 35 upon upward movement of the stem. Dirt is excluded from entering the casing chamber by a screen 38 mounted in a removable hollow plug 39 so that air may enter the chamber through the screen, but dust and dirt is excluded.

The valve stem 35 is now supported in position (shown in Fig. 4) upon the upper end of a guide plug 41 threaded into the lower end of the casing 15, and it is adapted to be periodically raised to open the valve 37 and close the valve 34 by an electrical actuating device which will now be described. The inner face of the cover 8 is formed to provide a depending annular flange 42, within which there is fixedly mounted an electromagnet consisting of the coils 43, an annular shell 44, and the circular pole piece. A disk-shaped armature 46 is equipped with a centrally disposed, upwardly extending post 47 of non-magnetic material, preferably surrounded by a sleeve 48 of brass or other suitable material, this post being disposed directly beneath and in alinement with the valve stem 35 so that upon lifting movement of the armature disk 46 upon energization of the coil, the valve stem will be lifted to close the valve 34 and open the valve 37. For the purpose of precluding undue wear, as the result of rapid and repeated sharp abutments of the upper end of the post 47 against the lower end of the valve stem, I have provided the lower end of the stem with a hardened wearing surface provided by a hardened steel screw 49 threaded into the lower end of the stem, as shown in Fig. 4. The magnet is permanently mounted in the cover flange 42 and is inclosed, together with the armature disk 46 by a cap 51 threaded onto the lower end of the flange so that the coils and armature are completely inclosed and protected against moisture or the milk in the interior of the pail, while at the same time, access thereto may be obtained when desirable by simply unscrewing the cap 51. In order to prevent the armature from sticking in elevated position, as the result of a partial vacuum within the cap, induced around the stem 35 from the vacuum chamber above, I prefer to provide a small vent passage 52, through which the space around the armature may be vented.

The winding of the coil terminates in a plug designated generally by reference character 53, consisting of an inner terminal 54 connected to one end of the coil, and an outer terminal or sleeve 55 connected to the other end of the coil, as shown in Fig. 5. A detachable plug of well known construction is inserted into this socket to establish the electrical connection, the plug being connected to a double wire cable carrying the wires 54, which in turn are connected to the wires 55 of the line, preferably by a removable plug (not shown). The electrical energy is derived from a generator or battery 56 of any preferred type and the current is caused to flow intermittently by a make and break contact, consisting preferably of a rotary controller comprising an insulated portion 57 and a metal portion 58 against which the brushes 59 and 61 operate respectively, the controller being continuously driven through a gear train from a motor 62, which also serves to drive the vacuum pump 14. The cover 8 is equipped with a handle 63 provided with hooks 64, upon which the teat cups and hose may be hung for purposes of transportation.

The operation of the machine is substantially as follows. A continuous vacuum is applied to the receptacle 7 through the passage 28 from the receptacle through the hose 24 to the interior of the teat cup. The continuously driven controller intermittently closes the electric circuit and at each energization of the magnet, the armature disk 46 is raised from the position shown in Fig. 4, thereby through the valve stem 35, closing valve 36 to shut off the vacuum to the hose 19 and opening valve 33, permitting atmospheric air to enter the hose 19 so that the lining 23 of the teat cup collapses under the vacuum induced in its interior into the position shown in Fig. 1. As soon as the circuit is broken by the controller, the armature and valves fall, thus closing valve 33 and shutting off the atmospheric air and again opening hose 19 to the vacuum in the pulsator valves casing, whereupon the lining is expanded, permitting a direct suction through the hose 24 upon the teat disposed in the teat cup. The magnet is then again energized and the cycle is repeated at frequent intervals, depending upon the speed of the controller, the most efficient rate of pulsation being about 54 per minute.

It will be observed that the pulsations occur with rhythmic regularity and are not controlled by or dependent in any manner upon the amount of vacuum, so that an increase or decrease in the vacuum will not affect the speed or rate of the pulsations.

I claim:

1. In a milking machine, the combination of a milk receptacle cover provided with a depending annular flange, an electromagnet disposed within said flange, a cover engaged with said flange to inclose said magnet, a pulsator casing mounted upon said cover, pulsator valves disposed within said casing, means actuated by said magnet for operating said valves, vacuum producing means, and means for intermittently energizing said magnet.

2. In a milking machine, the combination of a milk receptacle cover, an electromagnet mounted on the lower face of said cover, means for inclosing said magnet, pulsator valves arranged to be actuated by said magnet, and a vent opening through said cover into the magnet inclosure.

3. In a milking machine, the combination of a milk receptacle cover, an electromagnet mounted on the lower face thereof, a chamber inclosing said magnet, a vent opening from said chamber to said cover, pulsator valves arranged to be actuated by said magnet, means for periodically energizing said magnet, and means for producing a vacuum in said receptacle.

4. In a milking machine, the combination of a milk receptacle cover provided on its lower face with a depending annular flange, an electromagnet arranged within said flange, a cover threaded onto the lower end of said flange, an armature disk adapted to be actuated by said magnet, a post carried by said disk, a pulsator valve disposed above said cover and adapted to be actuated by said post, and a hardened wear-resisting element interposed between said post and the stem of said valve.

5. In a milking machine, the combination of a milk receptacle cover, an electromagnet attached to the lower face of said cover, an electrical socket projecting above said cover and connected with said magnet, a pulsator valve, operative connections between said valve and said magnet, vacuum inducing means, and means for periodically energizing said magnet.

PALMER B. HEWLETT.